March 22, 1955   C. K. NELSON   2,704,442
APPARATUS FOR MAKING FROZEN CONFECTIONS
Filed July 27, 1953   9 Sheets-Sheet 2
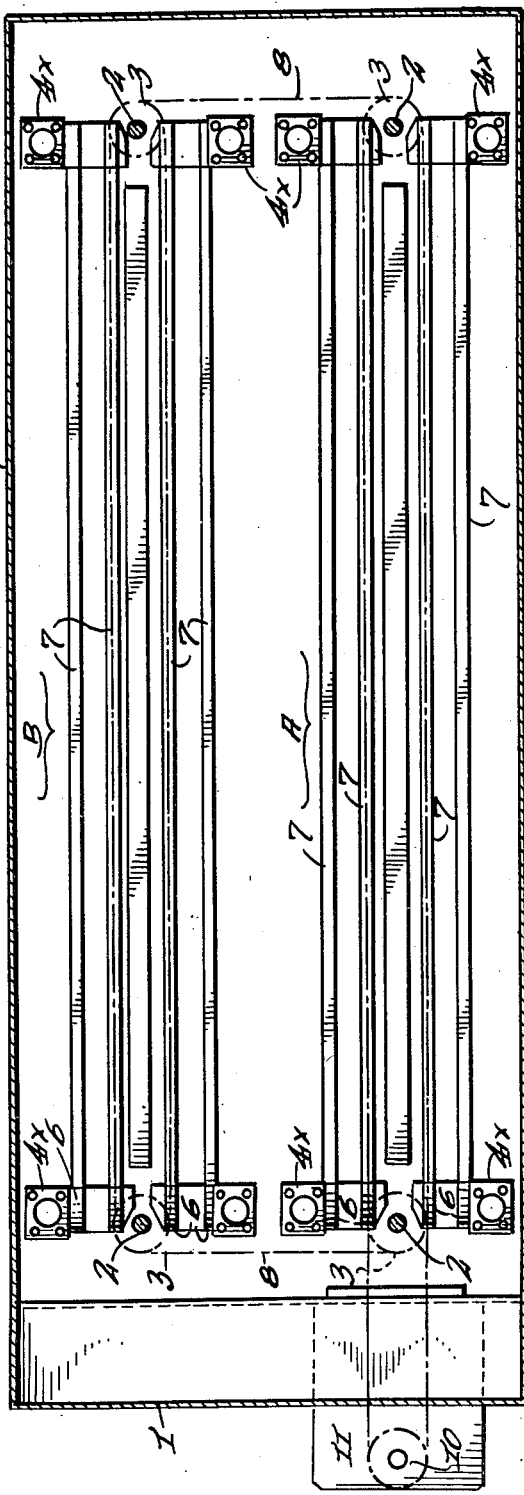
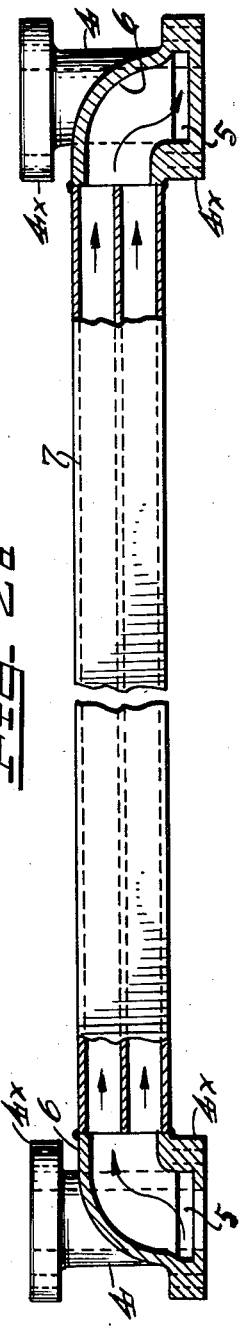
INVENTOR.
Christian K. Nelson
BY H. Lee Helms
attorney March 22, 1955   C. K. NELSON   2,704,442
APPARATUS FOR MAKING FROZEN CONFECTIONS
Filed July 27, 1953   9 Sheets-Sheet 3
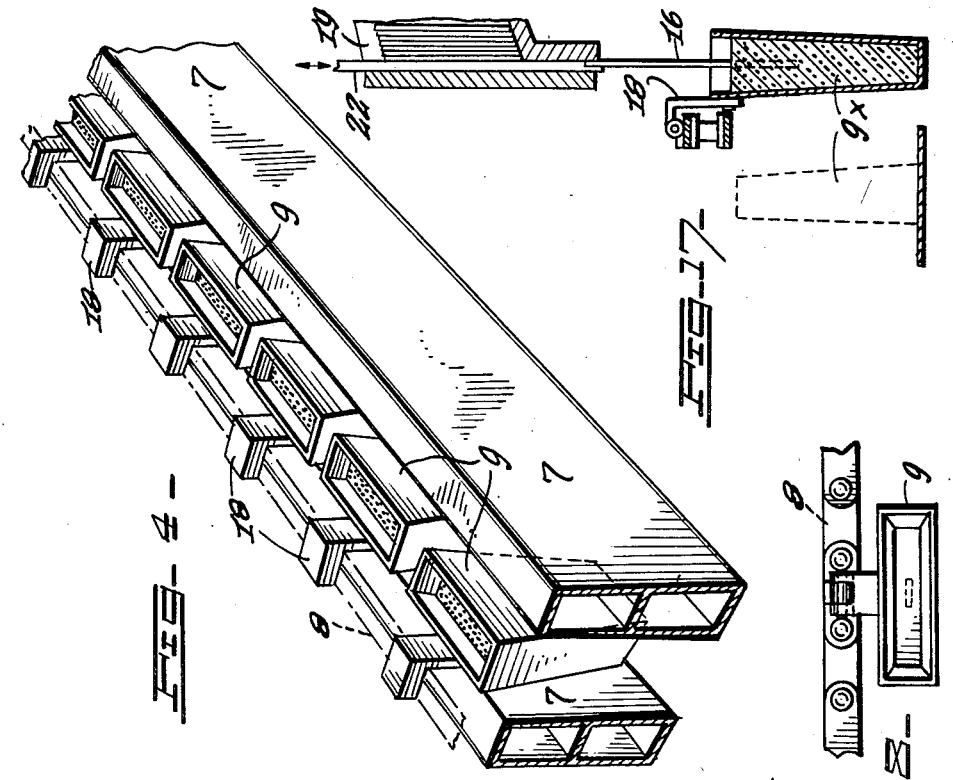
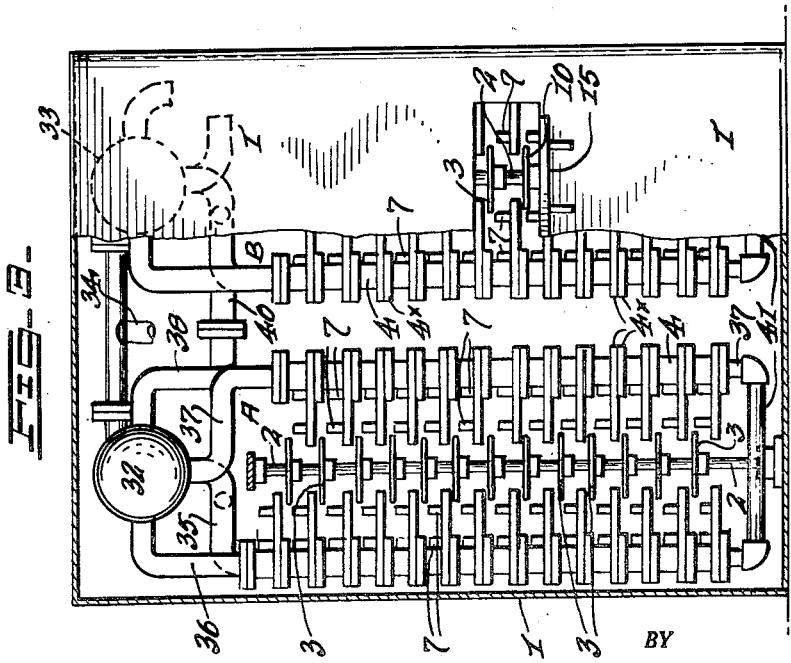
INVENTOR.
Christian K. Nelson

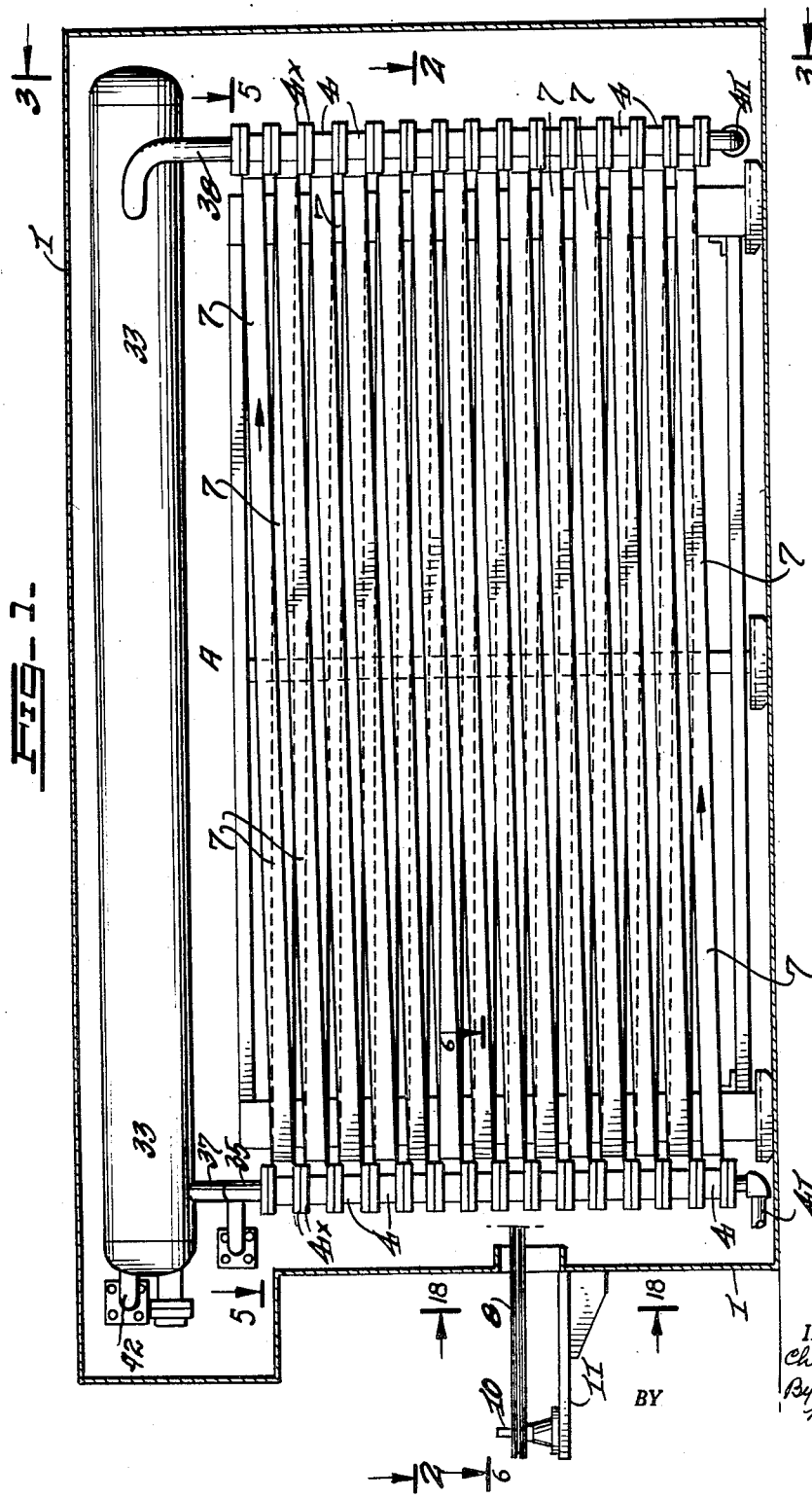

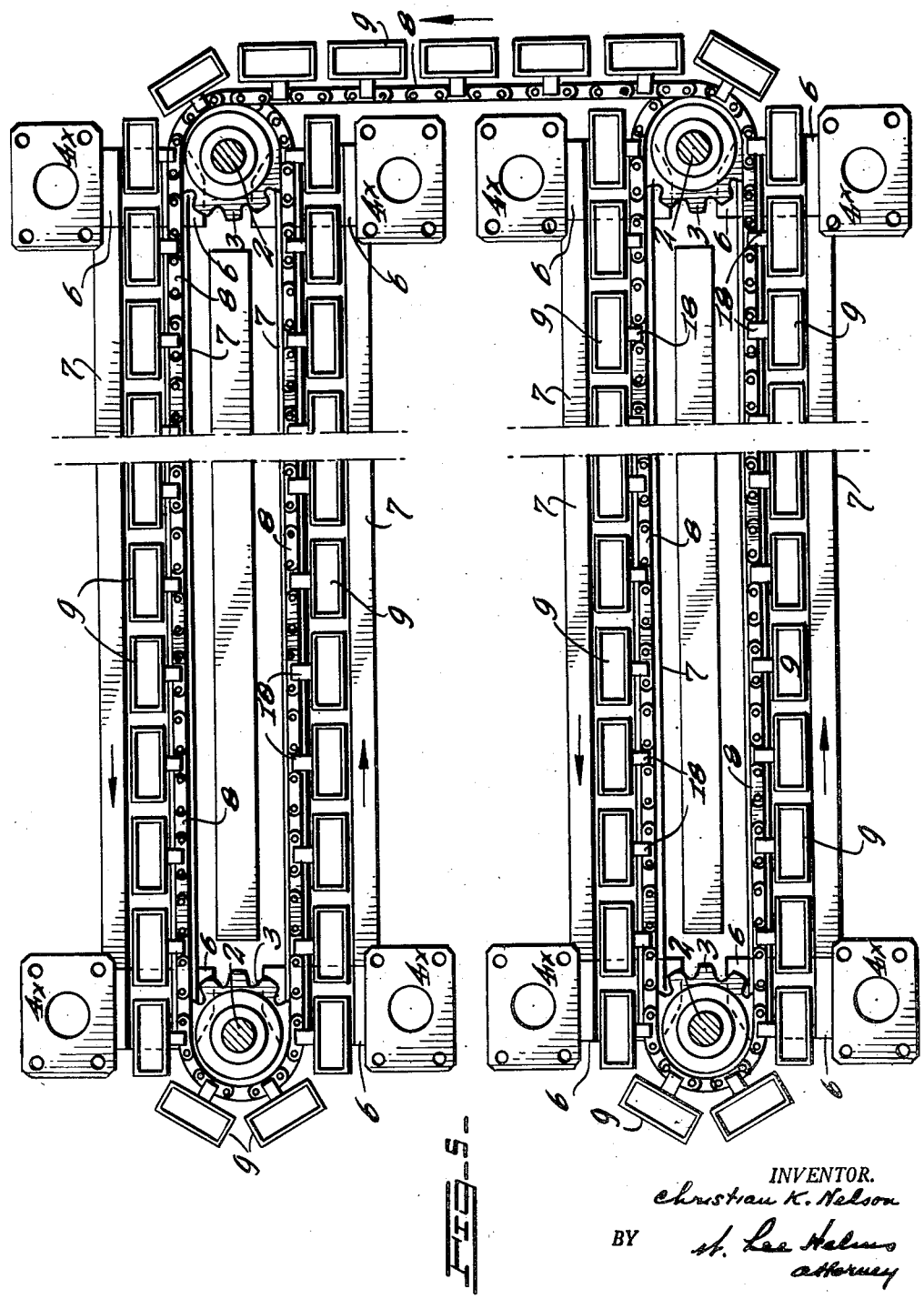

March 22, 1955 — C. K. NELSON — 2,704,442
APPARATUS FOR MAKING FROZEN CONFECTIONS
Filed July 27, 1953 — 9 Sheets-Sheet 5
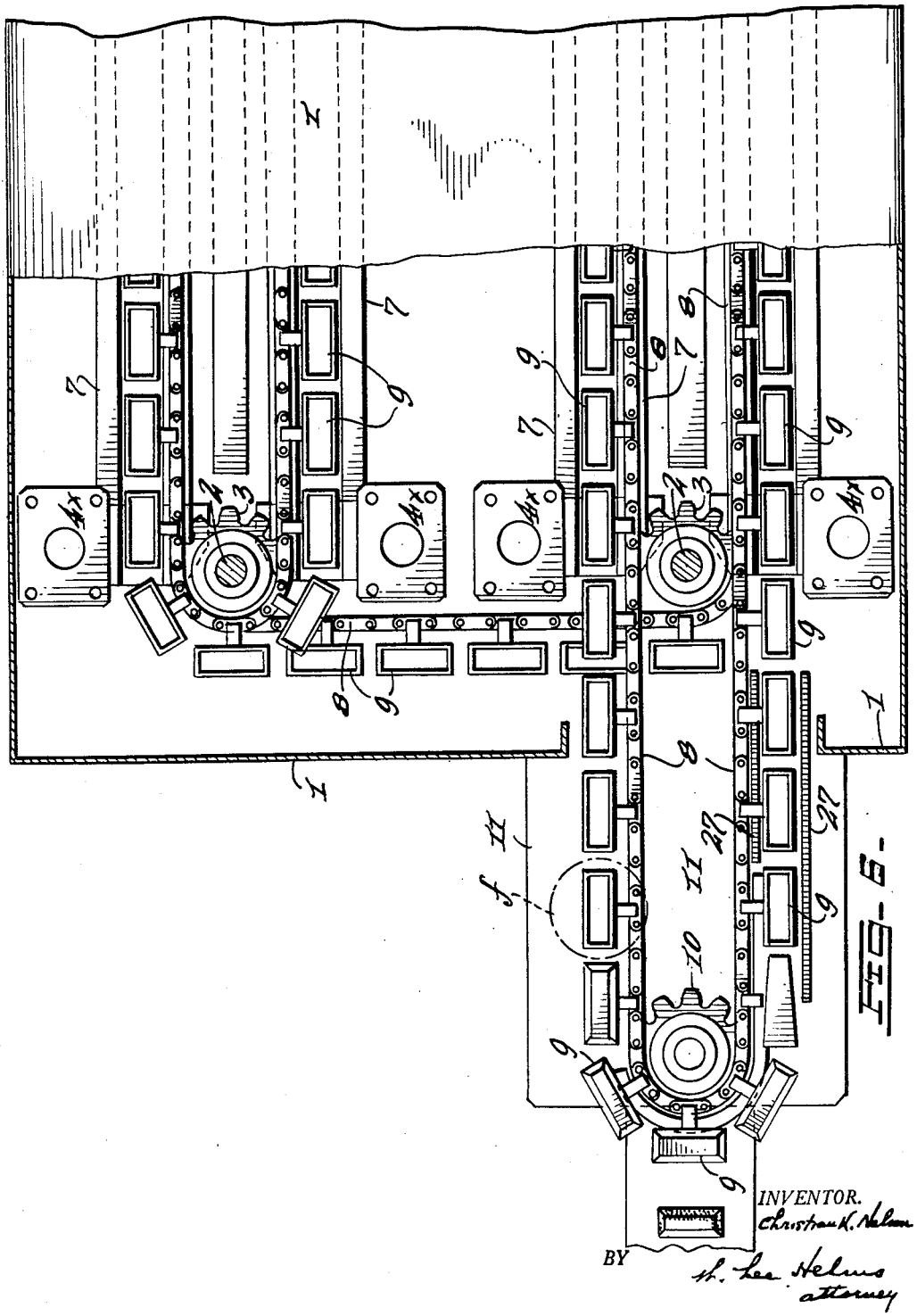

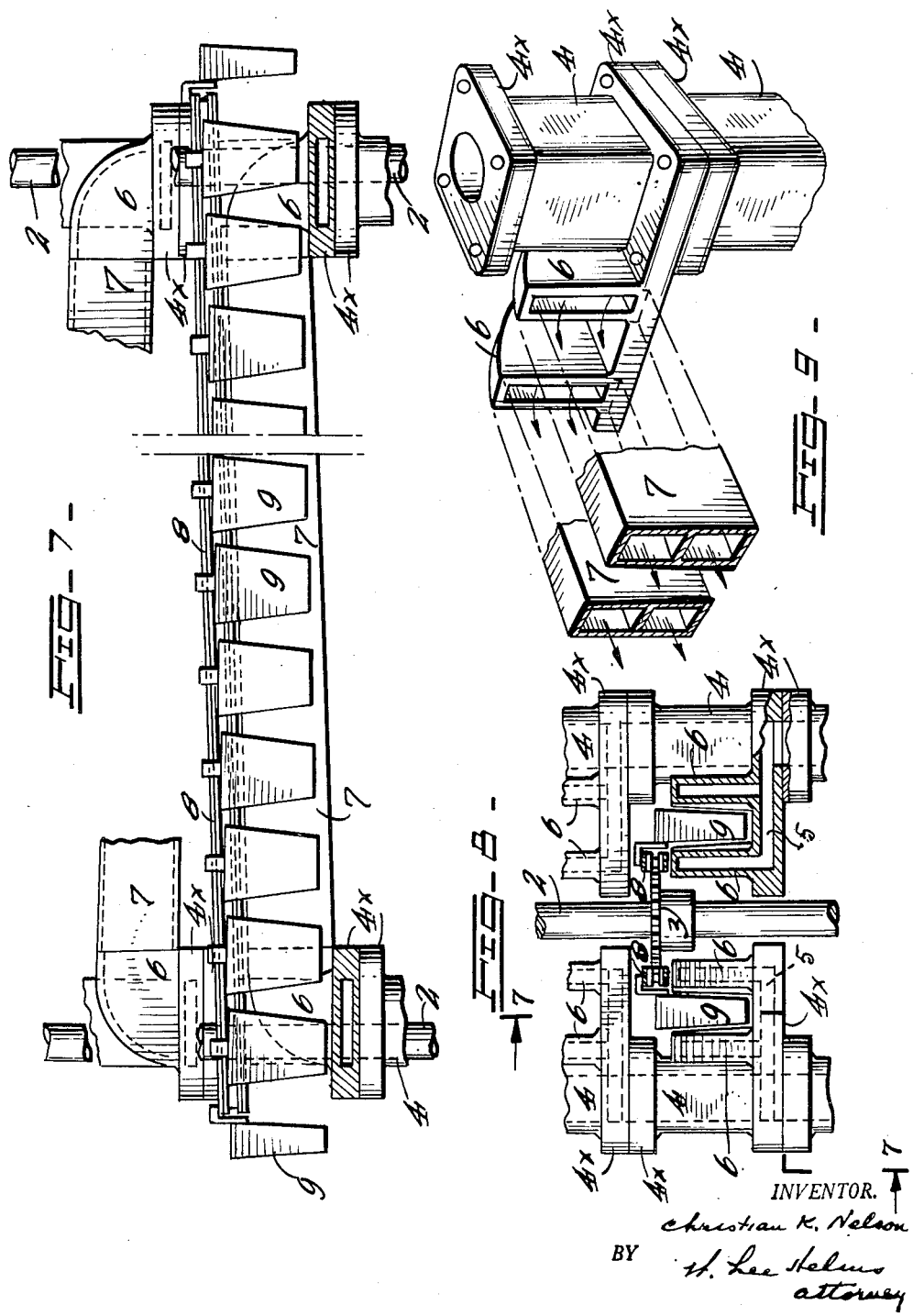

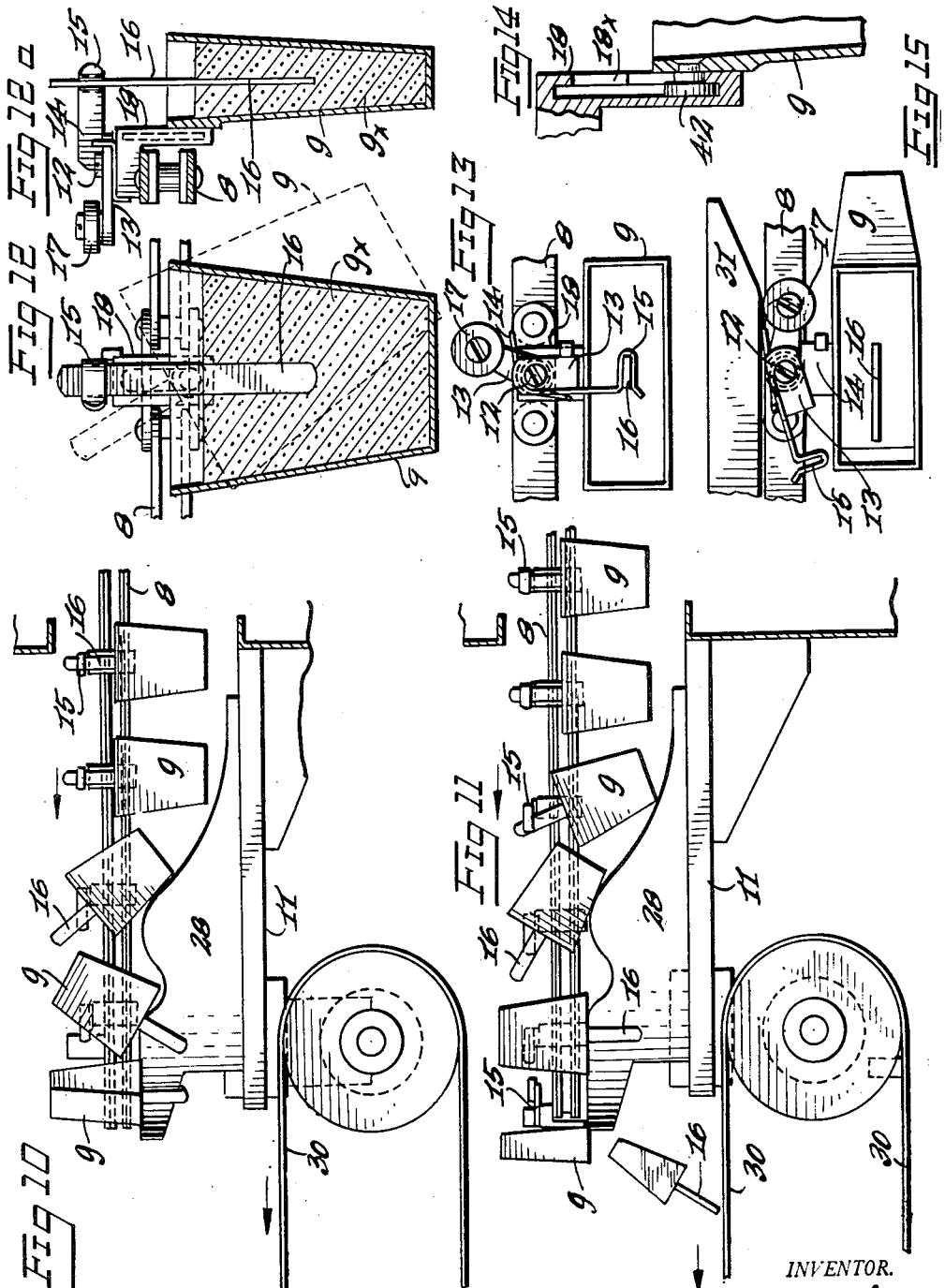

March 22, 1955 C. K. NELSON 2,704,442
APPARATUS FOR MAKING FROZEN CONFECTIONS
Filed July 27, 1953 9 Sheets-Sheet 8
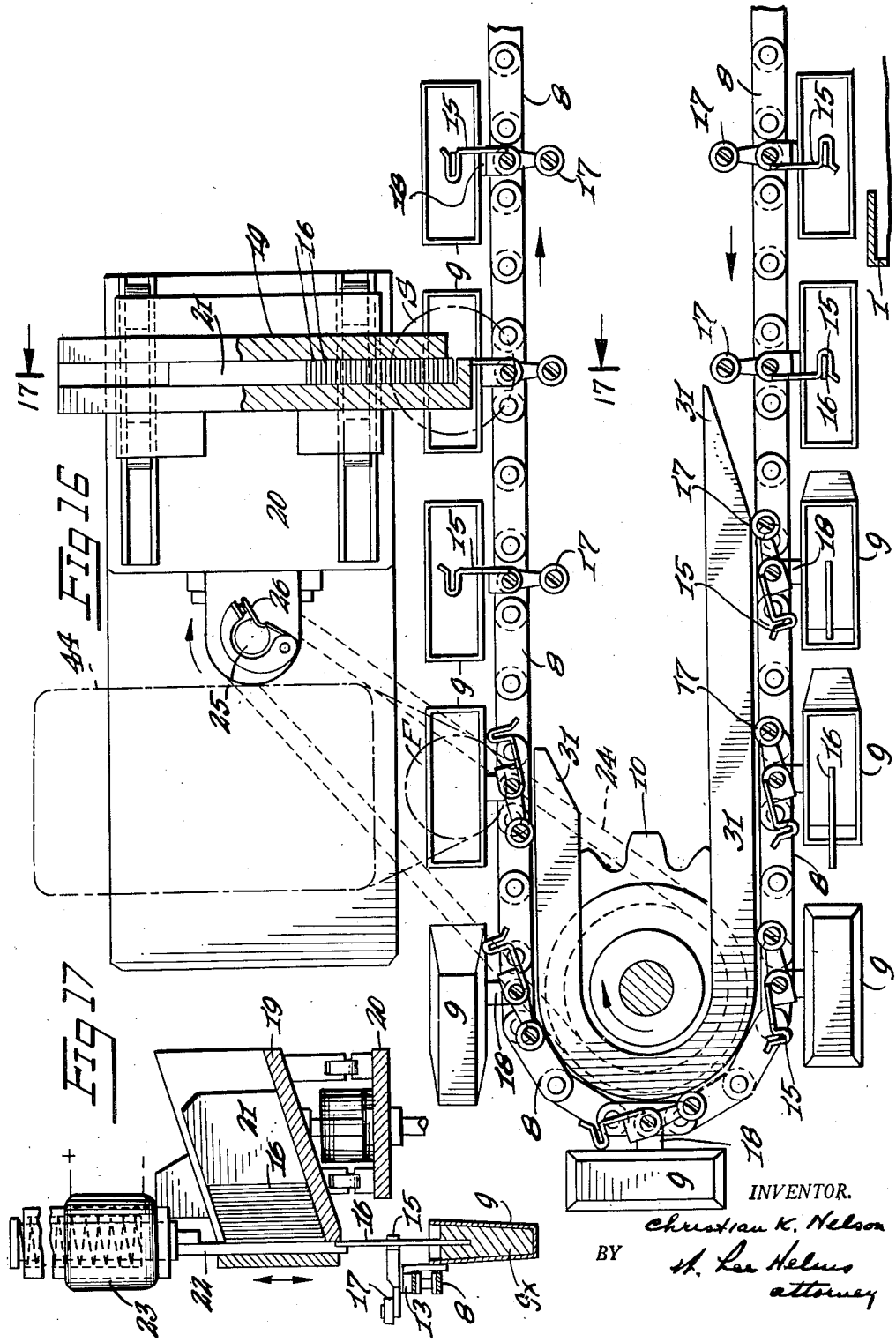
INVENTOR.
Christian K. Nelson
BY H. Lee Helms
attorney March 22, 1955  C. K. NELSON  2,704,442
APPARATUS FOR MAKING FROZEN CONFECTIONS
Filed July 27, 1953  9 Sheets-Sheet 9
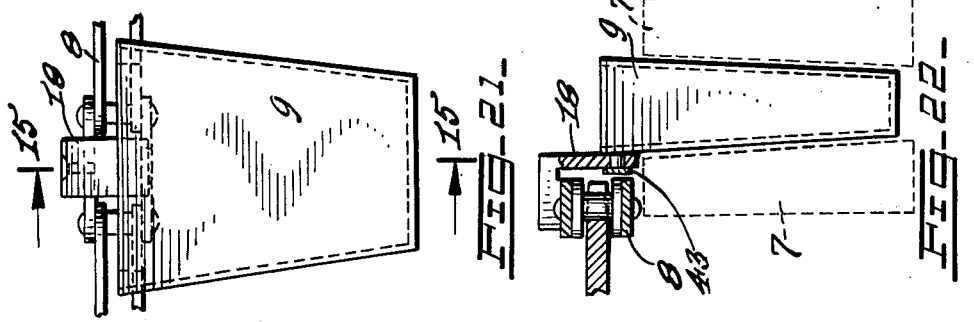
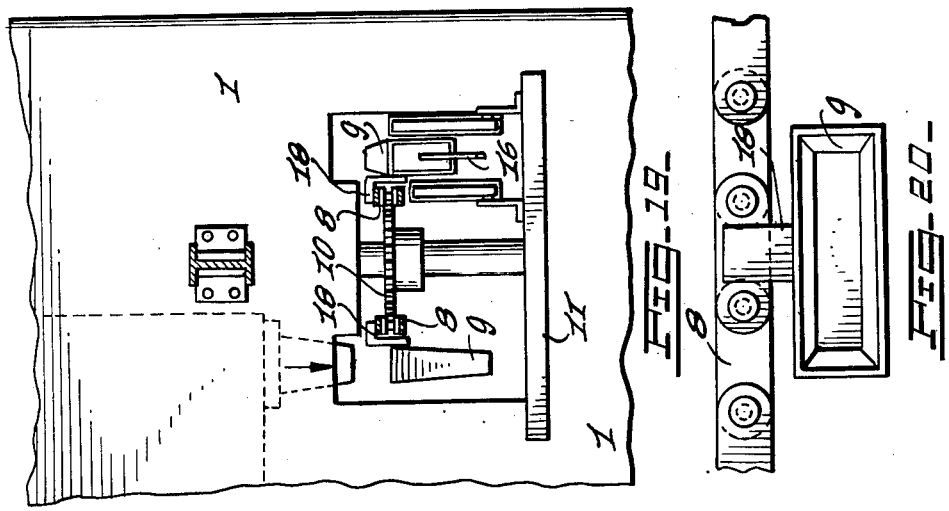
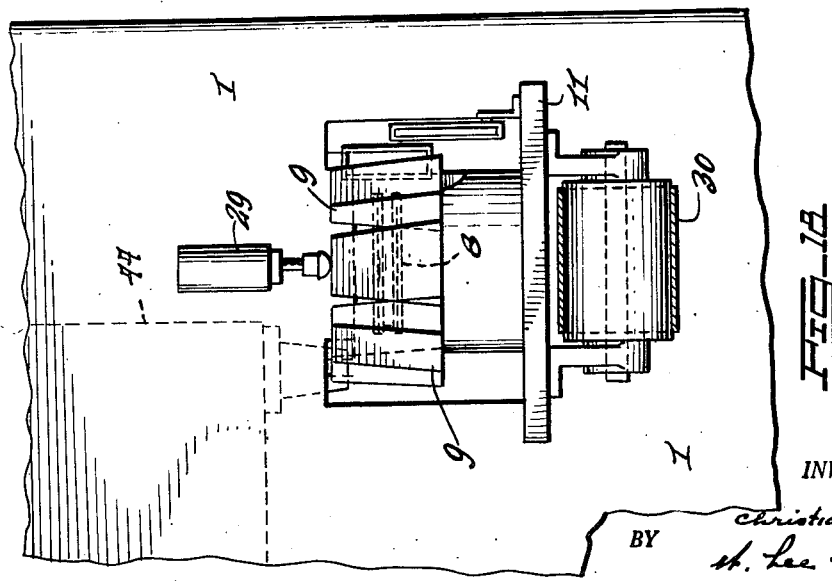
INVENTOR.
Christian K. Nelson
BY
H. Lee Helms
attorney

# United States Patent Office 2,704,442
Patented Mar. 22, 1955

2,704,442

APPARATUS FOR MAKING FROZEN CONFECTIONS

Christian K. Nelson, San Marino, Calif., assignor to Eskimo Pie Corporation, Bloomfield, N. J., a corporation of Delaware Application July 27, 1953, Serial No. 370,493

6 Claims. (Cl. 62—114)

The object of the present invention is to provide a machine for automatically manufacturing solid frozen confection bars, particularly bars which are composed of water ice or sherbert mixes and therefore have a relatively high water content.

A characteristic of the machine is that it provides means for supporting and carrying in an endless path a plurality of open end molds adapted to receive a fluid mix, the molds being carried into immediate contact with refrigerant elements arranged in two banks, the carrying means being such that the confections are moved in inclined paths up one bank of refrigeration unit and are transferred to a second bank for reverse movement, and are thence transferred to the first bank.

Means are provided for automatically defrosting the molds and for discharging the finally produced frozen confection bars with sticks imbedded therein, the assembly including a stick holding and centering device for each mold and automatic means for depositing sticks in said centering devices.

The above and other objects of the invention will be described with reference to the accompanying drawings, in which:

Fig. 1 is a vertical section through a casing for the elements of the apparatus, showing therein the side of one bank of refrigeration units and a flood tank, with refrigerant and refrigerant tubes and headers communicating with the tubes of the refrigerant bank;

Fig. 2 is a horizontal section on the line 2—2 of Fig. 1;

Fig. 2a is a view in side elevation, partly broken away, showing one of the refrigerant tubes and the end headers therefor;

Fig. 3 is a view, in elevation, showing the casing partly broken away, and showing one of the banks of refrigerant tubes and headers, and part of one bank;

Fig. 4 is a perspective view showing a pair of the refrigerant tubes and a plurality of molds in position for contact movement longitudinally of the tubes;

Fig. 5 is a horizontal section on the line 5—5 of Fig. 1, partly broken away;

Fig. 6 is a view similar to Fig. 4, being a horizontal section toward receiving and discharge end of the apparatus and taken on the line 6—6 of Fig. 1;

Fig. 7 is a longitudinal view, broken away, showing a lower refrigerant tube and an upper refrigerant tube, the headers therefor, a plurality of molds adjacent the lower refrigerant tube, the chain carrier for the molds, and drive means for the chain, being taken generally on the line 7—7 of Fig. 8;

Fig. 8 is a view in end elevation, partly broken away, showing the above elements and the chain drive;

Fig. 9 is a detail perspective view, partly broken away, showing the upper end of a lowermost header, a complete header above the same, and a pair of refrigerant tubes leading to the header;

Fig. 10 is a view in side elevation showing the means for inverting the molds after their heating for defrosting by the means indicated in Fig. 6;

Fig. 11 is a view similar to Fig. 10, showing means for restoring the inverted and discharge mold into filling position;

Fig. 12 is a detail view in vertical section showing a filled mold, the stick holding means, and a stick therein;

Fig. 12a is a similar view transversely thereof;

Fig. 13 is a plan view of the assembly shown in Fig. 12;

Fig. 14 is an enlarged fragmentary view showing the pivotal connection for each mold and carrier;

Fig. 15 is a very similar to Fig. 13 showing the mold and the cam operated stock holder release, whereby the stick holder is moved out of the mold position until after the discharge molds are filled;

Fig. 16 is a plan view showing one of the carrier chains, the cam means for retracting the stick holders, a filling station, and a stick inserting station with the stick insertion means;

Fig. 17 is a view in sectional elevation of the stick inserting means, the stick holder and certain other elements being shown in section, the section being taken on the line 17—17 of Fig. 16;

Fig. 18 is a view in sectional elevation showing the discharge and filling end of the machine;

Fig. 19 is a view in elevation, taken directly at the face of the casing back of the element shown in Fig. 18;

Fig. 20 is a detail view, in plan, showing the top of a chain section and one of the molds carried thereby;

Fig. 21 is a view showing the elements of Fig. 20 in front face elevation; and

Fig. 22 is a view, partly broken away, showing the mold, chain carrier and mold carrier elements transversely of Fig. 21, partly broken away, dotted lines showing a pair of the refrigerant tubes.

Referring to Figs. 1, 2, 2a, 3 and 9, it will be seen that at each end of a casing 1, which will in practice be heavily covered with insulation (not shown), there is mounted a spaced pair of sprocket carrying shafts 2. Each shaft 2 carries a plurality, in this case thirteen, of sprockets 3.

In Fig. 3 the left-hand sprocket shaft 2 is between a pair of inclined contact refrigeration elements and headers therefor, which will be termed refrigeration bank A, and to the right is a similar refrigeration bank, B, with reverse inclination of the tubes.

In the embodiment illustrated, for each refrigeration bank there is a straight vertical line of connected headers at each side of the appropriate sprocket shaft and at each end of the casing. The header construction is best shown in Fig. 9 with reference also to Fig. 2. It consists of a hollow casting 4 having upper and lower flanges 4x, the lower flange being hollow, as shown in Fig. 2a, to provide a horizontal chamber 5 communicating with two spaced vertical hollow heads 6 (Fig. 9), to each of which a hollow refrigerant tube 7 is welded or otherwise secured.

Referring to Fig. 1, which shows bank A looking at the left side in Fig. 3, it should be realized that the inclined dotted lines are boundary lines for the pair of superimposed refrigerant tubes on the opposite side of the sprocket shaft and sprockets of refrigerant bank A, and as indicated in Figs. 2 and 3. An endless chain 8, Figs. 5 and 6, which carries molds 9, which in the present embodiment are single cavity, but may be plural cavity, is led to the lowermost sprocket 3, Fig. 3, and carries the molds to the right in upward inclination between the pair of lowermost refrigerant tubes 7. When the chain reaches the opposite sprocket (see Fig. 2) the latter reverses the movement of the molds, carrying them to the left between the appropriate upwardly inclined pair of refrigerant tubes opposite those initially referred to.

The described action may continue until it becomes necessary to transfer the molds to the refrigerant bank B. This transfer of the chain and molds takes place at the top of the machine and as shown at the right-hand side of Fig. 5. The molds are then carried progressively downward and back and forth, first between one pair of bank B downwardly inclined refrigerant tubes and then in reverse downwardly inclined direction between a second pair of bank B refrigerant tubes and so on to the base of the machine.

The return of the chain to the initially described lowermost left-hand sprocket of refrigerant bank A is shown in Fig. 6.

Again referring to bank A and Figs. 1 and 6, it will be seen that in the traverse of the chain up refrigerant bank A it is, at a suitable point, in this case about half way in its upward traverse, led outwardly to a sprocket 10 on a table 11 secured to the outside of the casing 1. At such point the molds are discharged of the completely frozen material and the empty molds are recharged. The outwardly placed sprocket 10 and table 11 may be at any desired height and may be associated with either bank A or bank b. In either case there manifestly will be a complete traverse of the molds in contact with all the refrigerant tubes before reaching the discharge point.

Filling of the molds

The molds in the present embodiment are designed for the manufacture of water ice, sherbet, ice milk, and also are adapted for ice cream. Each has a tapered cavity and is preferably made of thin-walled metal with tapered sides conforming with the cavity. At the dotted line circle F, Fig. 6, the molds, in their movement, are filled with the mix to be frozen. This may be done in any suitable way, as, for example, by the well known filling apparatus for beverage containers. Such filling means forms no part of the present invention.

Insertion and holding of sticks in the molds

For stick-held frozen confections, means are provided for automatically inserting and centrally holding a stick in the generally-fluid charging material placed in each mold. Figs. 12 to 15 show such means. At spaced points on the chain and pivotally held by stud screws 12 is an arm 13 biased to the position of Fig. 13 by a spring 14. Carried by arm is a springy metal member 15 bent at its end to form a recessed grip for the stick 16. Also carried by the rear end of arm 13 is a roller 17.

Reference to Figs. 12 and 14 will show that each mold 9 is pivoted to the chain carried bracket 18 in which the pivot stud screw 12 for the stick holder is set.

Referring to Figs. 16 and 17, it will be seen that each mold, with its stick holder in position passes below the discharge end of a stick inserting assembly consisting of the stick holding box 19 and adjustably mounted on table 20, the stick receiving cavity of the box is inclined, as customary, and the sticks may be pressed forward by a slide weight 21. A reciprocating plunger 22 is adapted to be actuated by a solenoid actuator 23 so as to drive the sticks into and below the stick holder 15, the required distance into the fluid 9x, Fig. 17.

Assuming that the chain wheel sprocket 10, Fig. 16, will in one revolution remove four of the molds into register with the stick insertion plunger 22, this being by continuous movement of the molds and stick holders, chain drive 24 will impart four rotations to switch cam 25, Fig. 16, and the switch contacts at 26 would be closed a sufficient fraction prior to exact registration of the appropriate stick holder 15 sufficient to insure that the stick will be driven into the springy cavity of the stick holder at the proper time. It will be understood that cam 25 is carried by a shaft having a sprocket wheel driven by chain 24, these latter elements not being shown because their construction is obvious.

Discharge of the completely frozen confection

It is hereinbefore described that at a suitable point between the top and bottom of either bank of refrigerant tubes, the chain 8 may be led outwardly over the sprocket 10, illustrated more particularly in Figs. 6 and 16, the molds being carried outwardly of the casing and over a table 11, the molds having completed a full circuit through the machine and the confections being solidified. Reference to Figs. 6, 10, 11 and 16 will show that means are provided for moving the molds in such manner that the sticks are carried out of the stick holders and at the same time the molds are inverted for discharge of the contents after electrical heating of the mold walls. The electrical heating elements are indicated at 27, Fig. 6, and they may be of any desired type preferably low amperage quick heating strips.

As the molds proceed along table 11, they meet a cam 28 which initially so tilts the molds as to release them from the stick holders 15, the molds being finally inverted, after quick heating of the walls. As seen in Fig. 18, a vibrator 29 may act upon each inverted mold at its point of discharge over a carrier belt 30 and the confections may drop upon the belt and carried away for packing and storing, or to an enrober for application of a coating material.

Movement of the stick holders away from the molds for filling of the latter

Referring to the bottom of Fig. 16 and Fig. 10, it will be seen that molds are successively so tilted by cam 28 of Fig. 10 as to release the sticks from the stick holders 15. Then the rollers 17 are acted upon by cam 31 and the stick holders 15 are swung away from the molds and so held until the molds pass the filling point F, Fig. 16, whereupon the spring 14 applied to each lever 13, which carries roller 17, will swing the stick holders back to proper position before the appropriate holder and mold reaches the stick inserting assembly at S.

The flood type refrigerant circulation

Within the casing 1 at the top thereof are two flood tanks 32 and 33 which will be fed by brine or other suitable refrigerant, as, for example, by the inlet 34, Fig. 3. A suitable flow of the refrigerant is from flood tank 32 downward through pipe 35, Fig. 3, at the rear of the machine viewing Fig. 3, thence through appropriate headers and their connected refrigerant tube 7, and to the front of the machine, viewing Fig. 3. The refrigerant will then flow upwardly through pipe 36 and back to the refrigerant tank. The second bank will receive refrigerant from flood tank 32 via pipe 37, the refrigerant flowing down through the front headers, Fig. 3, back to the opposite end of the machine to the headers there from which the refrigerant will return to the flood tank via pipe 38. Flood tank 33 will give the same refrigerant circulation and both flood tanks will feed under pressure down the inclined tubes of both banks with suction up the corresponding inclined tubes of each bank. As all the tubes are inclined, gas bubbles are unimpeded in their upward movement back to the flood tank. Discharge pipes from the two flood tanks may be provided with a communicating cross pipe 40, and for each bank the downward flow of refrigerant when it reaches an end of the headers may communicate with the bank receiving an upsurge of refrigerant as by the pipe 41 in each case, Fig. 3. Pipe 42, Fig. 1, may be considered as a suction return to the refrigerant compressor.

In the drawings, clearances are shown between the molds and the refrigerant tubes 7, for clarity in their illustration, but it will be understood that the molds will directly contact with the refrigerant tubes and their slightly tapered sides will contact with correspondingly tapered sides of the refrigerant tubes. When, in each bank, a mold turns at the end of the machine it is reversed in position. Therefore, while I have shown each mold between and in contact with two refrigerant tubes, the refrigerant bank, in each case, may consist of two tubes only, one at each side of the sprockets 3, in which case each mold will have one face contacting with refrigerant tube in the movement of the mold in one direction, the opposite face contacting with the refrigerant tube in the reverse direction. However, for most efficient and rapid solidification of the confections, I prefer that each opposite broad face of the molds simultaneously contact with two refrigerant tubes.

Also it will be understood that the machine may be operated by a manufacturer of frozen confections without sticks, in which case the stick inserting mechanism and stick holders will be eliminated.

It will further be understood that means other than shown in Figs. 10 and 11 may be employed for discharging the frozen confections from their molds immediately after quick heating of the walls, preferably by electrical conduction. The method of pivotally hanging the molds to the carriers 18 secured to chain 8 is desirable because it enables quick removal of the molds. Thus the slot 18x may be enlarged at its top for ready insertion of the head of pivot stud 42 and quick removal of the molds. However, an ordinary pivot stud 43, as shown in Fig. 22, may be employed.

In Figs. 18–22 the stick holders are not shown so that the machine is set up for confections which do not have sticks.

In the drawings, the dotted lines, Figs. 16 and 18 at 44, diagrammatically show the position of a filling tank and nozzle for the molds.

It will be understood that modifications may be made in the form and arrangement of the embodiments illustrated in the drawings without departure from the spirit of the invention.

Having described my invention, what I claim and desire to secure by Letters Patent is as follows:

1. In apparatus for making frozen confections, a casing, two transversely spaced pairs of vertically supported shafts and a plurality of sprockets spaced on each shaft, two banks of refrigerant tubes and means for circulating a refrigerant therein, each bank consisting of at least two laterally spaced sets of superimposed and inclined side-contact tubes, one set at each side of each pair of shafts and corresponding to the number of sprockets, the tubes of the first bank being progressively inclined upwardly, and the tubes of the second bank being progressively inclined downwardly, an endless chain led progressively and in upward inclination longitudinally of the casing on the sprockets appurtenant to the first bank, thence extending to a sprocket of the second bank and led in downward inclination longitudinally of the casing on the remaining sprockets of the second bank, and thence to a sprocket on the first bank for return to the latter, hollow mold members spaced on the chain and having side-contact with the refrigerant tubes.

2. Apparatus for making frozen confections constructed in accordance with claim 1, in combination with a table support exterior of the casing, the casing being apertured adjacent said support, and sprocket means on said support over which a projected length of the chain is led carrying the molds exterior of the casing for discharge of frozen confections and filling with a frozen confection mix.

3. Apparatus for making frozen confections constructed in accordance with claim 1, in combination with refrigerant circulating supports for the tubes and consisting of a flanged header for each tube, the headers for the tubes at each end of the appropriate bank being superimposed and secured together in fluid type relationship so that each assembly of headers is a rigid supporting column, each header having communication with the tube means secured to and carried thereby.

4. Apparatus for making frozen confections constructed in accordance with claim 1, in combination with refrigerant circulating supports for the tubes and consisting of a flanged header for each tube, the headers for the tubes at each end of the appropriate bank being superimposed and secured together in fluid type relationship so that each assembly of headers is a rigid supporting column, each header having communication with the tube means secured to and carried thereby, in combination with a flood type refrigerant tank for each bank of refrigerant tubes and refrigerant flow means from said tank communicating with the upper ends of the header assemblage, said flood tank discharging into the header means communicating with the vertically raised ends of the inclined tubes, and means communicating the header means for the downwardly inclined tubes with a refrigerant intake area of the flood tank.

5. Apparatus for making frozen confections constructed in accordance with claim 1, in which the side walls of the molds are tapered toward their lower ends and the refrigerant tubes are correspondingly tapered for close contact with the molds.

6. Apparatus for making frozen confections constructed in acocrdance with claim 1, in combination with two longitudinally spaced pairs of headers, the headers of each pair being superimposed and so connected as to form rigid column supports, each header having a hollow flange communicating with two spaced flow heads integral with said flange, and the header columns of each pair having between them shafts and sprockets whereby movement of the chain carries the molds into contact with the sides of two parallel tubes, in each direction of movement of the chain.

References Cited in the file of this patent
UNITED STATES PATENTS

| | | |
|---|---|---|
| 1,936,584 | Cobb | Nov. 28, 1933 |
| 1,960,456 | Robb | May 29, 1934 |
| 1,992,135 | Underwood | Feb. 19, 1935 |
| 1,998,431 | Birdseye | Apr. 23, 1935 |
| 2,573,725 | Polk | Nov. 6, 1951 |
| 2,614,510 | Heise | Oct. 21, 1952 |
| 2,625,120 | Eddy et al. | Jan. 13, 1953 |